United States Patent
Benedetti et al.

(10) Patent No.: US 8,060,885 B2
(45) Date of Patent: Nov. 15, 2011

(54) CREATING TASK QUERIES FOR CONCRETE RESOURCES USING ALIAS SELECTION FIELDS SPECIFYING FORMAL RESOURCES AND FORMAL RELATIONSHIPS

(75) Inventors: Fabio Benedetti, Rome (IT); Paolo Deidda, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 11/866,570

(22) Filed: Oct. 3, 2007

(65) Prior Publication Data

US 2008/0082982 A1 Apr. 3, 2008

(30) Foreign Application Priority Data

Oct. 3, 2006 (EP) .................................. 06121682

(51) Int. Cl.
G06F 9/46 (2006.01)
G06F 7/00 (2006.01)
G06F 15/173 (2006.01)
(52) U.S. Cl. ...................... 718/104; 707/790; 709/226
(58) Field of Classification Search .................. 707/790
See application file for complete search history.

(56) References Cited

U.S. PATENT DOCUMENTS

| | | | | |
|---|---|---|---|---|
| 5,442,791 A * | 8/1995 | Wrabetz et al. | ............... | 709/226 |
| 6,901,446 B2 * | 5/2005 | Chellis et al. | ................. | 709/226 |
| 6,976,015 B2 * | 12/2005 | Kumar et al. | .......... | 707/999.003 |
| 7,062,514 B2 * | 6/2006 | Harris | ..................... | 707/999.003 |
| 7,337,170 B2 * | 2/2008 | Lee et al. | ............... | 707/999.006 |
| 7,568,199 B2 * | 7/2009 | Bozak et al. | .................. | 718/104 |
| 7,577,722 B1 * | 8/2009 | Khandekar et al. | ........... | 709/220 |
| 7,580,949 B2 * | 8/2009 | Dettinger et al. | ...... | 707/999.003 |
| 2004/0133413 A1 * | 7/2004 | Beringer et al. | ................ | 703/22 |
| 2005/0138625 A1 * | 6/2005 | Carroll et al. | ................. | 718/104 |
| 2006/0015388 A1 * | 1/2006 | Flockhart et al. | ................ | 705/9 |
| 2006/0031444 A1 * | 2/2006 | Drew et al. | .................... | 709/223 |
| 2006/0080666 A1 * | 4/2006 | Benedetti et al. | ............. | 718/104 |
| 2006/0112109 A1 * | 5/2006 | Chowdhary et al. | .......... | 707/100 |

* cited by examiner

Primary Examiner — Jennifer To
Assistant Examiner — Bing Zhao
(74) Attorney, Agent, or Firm — Jeffrey S. LaBaw

(57) ABSTRACT

A solution is proposed for facilitating the selection of execution servers to be used in a scheduler for submitting the execution of jobs. Each job is defined by a corresponding descriptor. The descriptor specifies the execution servers to be used by the jobs in a formal way (through their properties); in addition, the descriptor may also include the definition of formal relationships to be satisfied by the execution server with other resources of the system (in turn defined in a formal way through their properties). A query is created according to the descriptor for selecting (concrete) execution servers having the desired properties and satisfying the desired relationships with the resources of the system. This query is then run on a central database, wherein all the concrete execution servers, resources and relationships are defined. In this way, it is possible to obtain a list of concrete execution servers eligible to execute the job in a single transaction.

19 Claims, 5 Drawing Sheets

TB_ES

| ES_ID | ES_NM | ES_SZ |
|---|---|---|
| ES_ID1 | 2 | 15G |
| ES_ID2 | 1 | 15G |
| ES_ID3 | 2 | 10G |
| ES_ID4 | 2 | 5G |
| ES_ID5 | 4 | 20G |
| ES_ID6 | 4 | 10G |
| ES_ID7 | 2 | 20G |

TB_OS

| OS_ID | OS_TY | OS_SZ |
|---|---|---|
| OS_ID1 | OS_TY1 | 256M |
| OS_ID2 | OS_TY2 | 256M |
| OS_ID3 | OS_TY1 | 128M |
| OS_ID4 | OS_TY2 | 256M |
| OS_ID5 | OS_TY3 | 256M |
| OS_ID6 | OS_TY1 | 512M |
| OS_ID7 | OS_TY2 | 512M |

TB_DS

| DS_ID | DS_DB |
|---|---|
| DS_ID1 | DS_DB1 |
| DS_ID2 | DS_DB2 |
| DS_ID3 | DS_DB2 |
| DS_ID4 | DS_DB3 |

TB_AS

| AS_ID | AS_SW |
|---|---|
| AS_ID1 | AS_SW1 |
| AS_ID2 | AS_SW1 |
| AS_ID3 | AS_SW2 |
| AS_ID4 | AS_SW3 |
| AS_ID5 | AS_SW2 |

TB_RL

| RL_TY | RL_SR | RL_TR |
|---|---|---|
| Contain | ES_ID1 | OS_ID1 |
| Contain | ES_ID2 | OS_ID2 |
| Contain | ES_ID3 | OS_ID3 |
| Contain | ES_ID4 | OS_ID4 |
| Contain | ES_ID5 | OS_ID5 |
| Contain | ES_ID6 | OS_ID6 |
| Contain | ES_ID7 | OS_ID7 |
| Access | ES_ID1 | DS_ID1 |
| Access | ES_ID1 | DS_ID2 |
| Access | ES_ID5 | DS_ID4 |
| Access | ES_ID6 | DS_ID1 |
| Access | ES_ID6 | DS_ID3 |
| Access | ES_ID1 | AS_ID1 |
| Access | ES_ID3 | AS_ID1 |
| Access | ES_ID3 | AS_ID5 |
| Access | ES_ID6 | AS_ID3 |
| Access | ES_ID7 | AS_ID4 |

FIG.3a

| ES0.ES_ID | ES0.ES_NM | ES0.ES_SZ |
|---|---|---|
| ES_ID1 | 2 | 15G |
| ES_ID6 | 4 | 10G |

| OS0.OS_ID | OS0.OS_TY | OS0.OS_SZ | DS0.DS_ID | OS0.DS_DB | OS1.DS_ID | OS1.DS_DB | AS0.AS_ID | AS0.AS_SW |
|---|---|---|---|---|---|---|---|---|
| OS_ID1 | OS_TY1 | 256M | DS_ID1 | DS_DB1 | DS_ID2 | DS_DB2 | AS_ID1 | AS_SW1 |
| OS_ID6 | OS_TY1 | 512M | DS_ID1 | DS_DB1 | DS_ID3 | DS_DB2 | AS_ID3 | AS_SW2 |

CREATING TASK QUERIES FOR CONCRETE RESOURCES USING ALIAS SELECTION FIELDS SPECIFYING FORMAL RESOURCES AND FORMAL RELATIONSHIPS

FIELD OF THE INVENTION

The present invention relates to the information technology field. More specifically, the invention relates to the scheduling of work units in a data processing system.

BACKGROUND ART

Scheduling of different work units (for example, batch jobs) is a commonplace activity in data processing systems. For this purpose, workload schedulers are available to automate the submission of large quantities of jobs according to a specific plan (for example, based on constraints defined by the completion of other jobs); an example of commercial scheduler is the "IBM Tivoli Workload Scheduler (TWS)" by IBM Corporation".

Typically, the scheduler controls the submission of the jobs on a set of execution servers from a central scheduling server. This allows implementing systems to be very powerful and easily scaleable. Moreover, the same structure ensures high reliability (since the plan can be run even in case of failure of one or more execution servers). Workload-balancing techniques may also be exploited to optimize the distribution of the jobs among the execution servers.

In this case, the scheduler selects the execution servers for the jobs dynamically when they are submitted for execution. For this purpose, each job specifies any hardware and/or software resources that are required for its execution (such as microprocessors, RAM, operating systems, software applications, databases, and the like); the scheduler determines the execution servers having the required resources and then selects one of them for executing the job (for example, according to their current workloads).

Document US-A-2006/0080666 (the entire disclosure of which is herein incorporated by reference) proposes a solution for managing more complex environments. In this case, each job specifies the required resources by means of formal definitions based on their properties. Moreover, the description of the job may include the specification of relationships that must be satisfied with other resources; those relationships are in turn specified by means of formal definitions based on the properties of the other resources. For example, it is possible to indicate that the job must be submitted on an execution server having an operating system of a specific type and accessing another computer that runs a specific application.

The identification of the actual resources that satisfy the above-mentioned conditions is quite complex. For this purpose, the cited document proposes an iterative method. Particularly, at first a set of eligible resources possessing the desired properties is selected. A loop is then performed to reduce this set by removing the eligible resources that cannot satisfy all the relationships (until no further eligible resource is removed).

However, the above-described iterative method is very time consuming. This has a detrimental effect on the performance of the scheduler.

As an extreme case, the application of the proposed solution may even be not feasible in specific environments (with very strict time constraints).

Moreover, the relatively long time required by the iterative method does not allow ensuring the consistency of the information that is used during the whole process (for example, because the resources have changed in the meanwhile). Therefore, it is impossible to guarantee the integrity of the results being obtained.

This can cause errors in the executions of the jobs (for example, when some jobs are submitted on execution servers that do not have the required resources actually). This is very serious when the error affects a critical job (on which many other jobs depend for their execution); as a result, the execution of the whole plan (or at least of a substantial part thereof) may be blocked.

All of the above hinders the widespread application of the proposed solution; this drawback is more acute in environments where its implementation would be particularly useful (for example, in distributed systems—especially based on the Internet).

SUMMARY OF THE INVENTION

In its general terms, the present invention is based on the idea of identifying the required resources by means of a query.

Particularly, the present invention provides a solution as set out in the independent claims. Advantageous embodiments of the invention are described in the dependent claims.

More specifically, an aspect of the invention provides a method for scheduling execution of work units in a data processing system. The method starts with the step of providing a configuration database, which includes an indication of concrete resources available in the system for executing the work units and an indication of concrete relationships established in the system among the concrete resources; each concrete resource has a set of corresponding properties. The method continues by providing a descriptor of at least one work unit to be executed. The descriptor includes a definition of a set of formal resources required by the work unit and an indication of a set of formal relationships to be satisfied by the formal resources; the definition of each formal resource includes an indication of a set of required values of corresponding properties. A query is created for each work unit; the query includes a set of selection fields for each formal resource and a selection condition based on the required values of the formal resources and on the formal relationships. The method continues by running the query for each work unit on the configuration database; the query returns an indication of concrete resources corresponding to the formal resources. Each work unit is then submitted for execution on a selected one of the returned concrete resources for each formal resource.

For example, the resources include execution entities (for executing the work units) and auxiliary resources (to be used by the execution entities).

In an embodiment of the invention, the query includes a different set of alias selection fields for each formal resource of the same type included in formal relationships in logical AND conjunction.

On the other hand, a single set of alias selection fields may be use for all the formal resources of the same type included in formal relationships in logical OR conjunction.

Typically, the configuration database includes different tables for each type of concrete resources.

On the other hand, a single table may be used for all the concrete relationships.

Preferably, the concrete relationships are always between a source resource and a target resource.

A way to further improve the solution is to support shortcuts in the definition of the formal resources.

Another aspect of the invention proposes a computer program for performing the method.

A further aspect of the invention proposes a corresponding system.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which:

FIGS. 3a-3b illustrate an exemplary application of the solution according to an embodiment of the invention.

DETAILED DESCRIPTION

Figure 1:
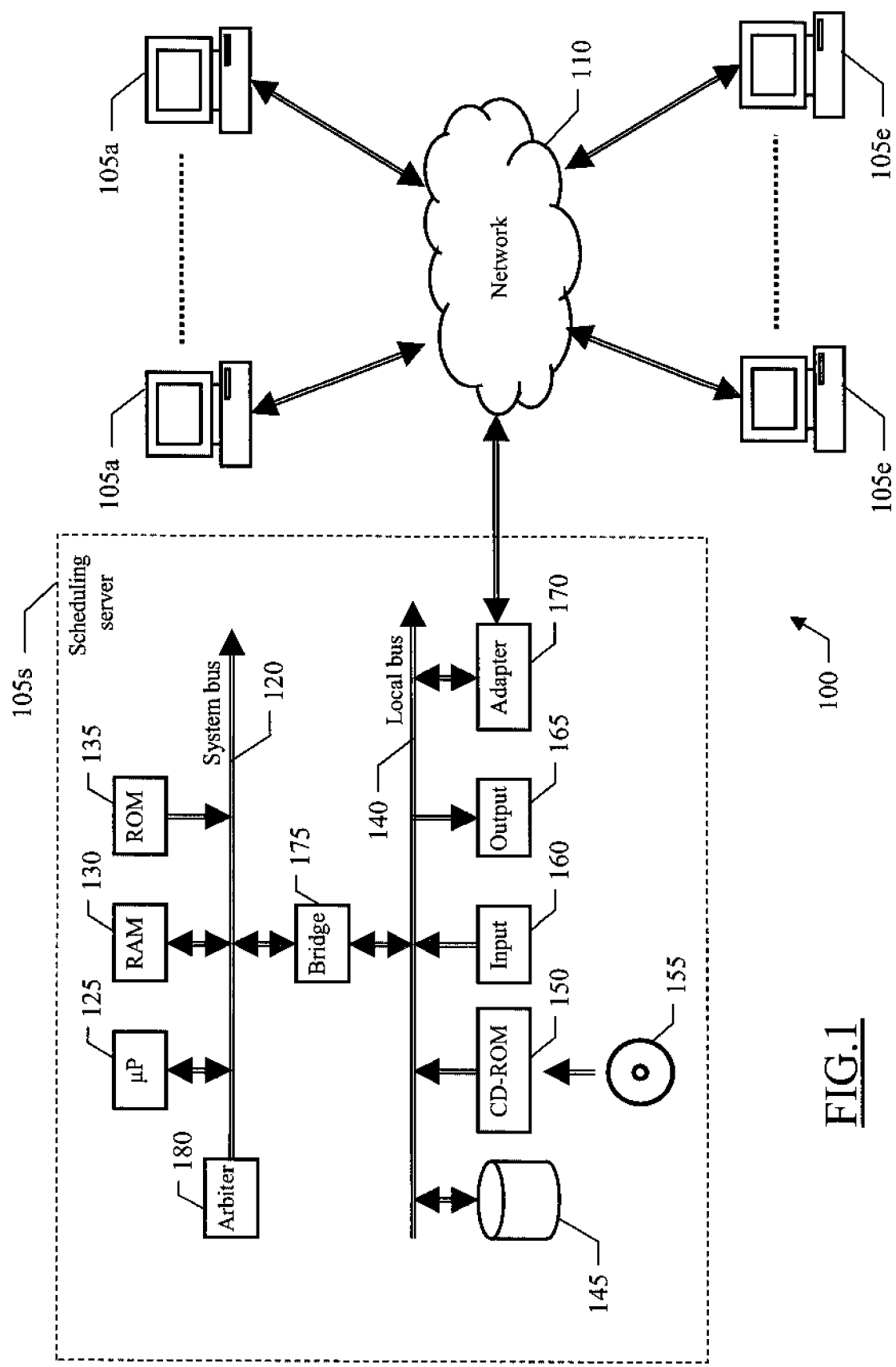
FIG. 1 is a schematic block diagram of a data processing system in which the solution according to an embodiment of the invention is applicable.

With reference in particular to FIG. 1, a data processing system 100 with distributed architecture is illustrated. The system 100 includes a plurality of server computers (or simply servers).

More specifically, one of the servers operates as a scheduling server (denoted with 105s). The scheduling server 105s is used to automate, monitor and control the execution of work units from a central point of the system 100; typically, the work units consist of non-interactive jobs (for example, payroll programs, cost analysis applications, and the like). The jobs are executed on a set of servers operating as execution servers (denoted with 105e). The other servers operate as auxiliary servers (denoted with 105a), which implement additional services that may be used by the execution servers 105s; for example, the auxiliary servers 105s are database servers (controlling one or more databases), application servers (running one or more software applications), and the like.

The servers 105s, 105e, 105a communicate to one another through a network infrastructure 110; for example, the network infrastructure 100 includes one or more LANs, which are connected to the Internet. Typically, the scheduling server 105s and the execution servers 105e are connected to an internal LAN of an organization; the auxiliary servers 105a may instead be connected to the same LAN or they may be accessed through the Internet.

Particularly, the scheduling server 105s is formed by several units that are connected in parallel to a system bus 120. In detail, multiple microprocessors (μP) 125 control operation of the scheduling server 105; a RAM 130 is directly used as a working memory by the microprocessors 125, and a ROM 135 stores basic code for a bootstrap of the scheduling server 105. Several peripheral units are clustered around a local bus 140 (by means of respective interfaces). Particularly, a mass storage consists of one or more hard-disks 145 and drives 150 for reading CD-ROMs 155. Moreover, the scheduling server 105 includes input units 160 (for example, a keyboard and a mouse), and output units 165 (for example, a monitor and a printer). An adapter 170 is used to connect the scheduling server 105 to the network 115. A bridge unit 175 interfaces the system bus 120 with the local bus 140. Each microprocessor 125 and the bridge unit 175 can operate as master agents requesting an access to the system bus 120 for transmitting information. An arbiter 180 manages the granting of the access with mutual exclusion to the system bus 120.

Figure 2:
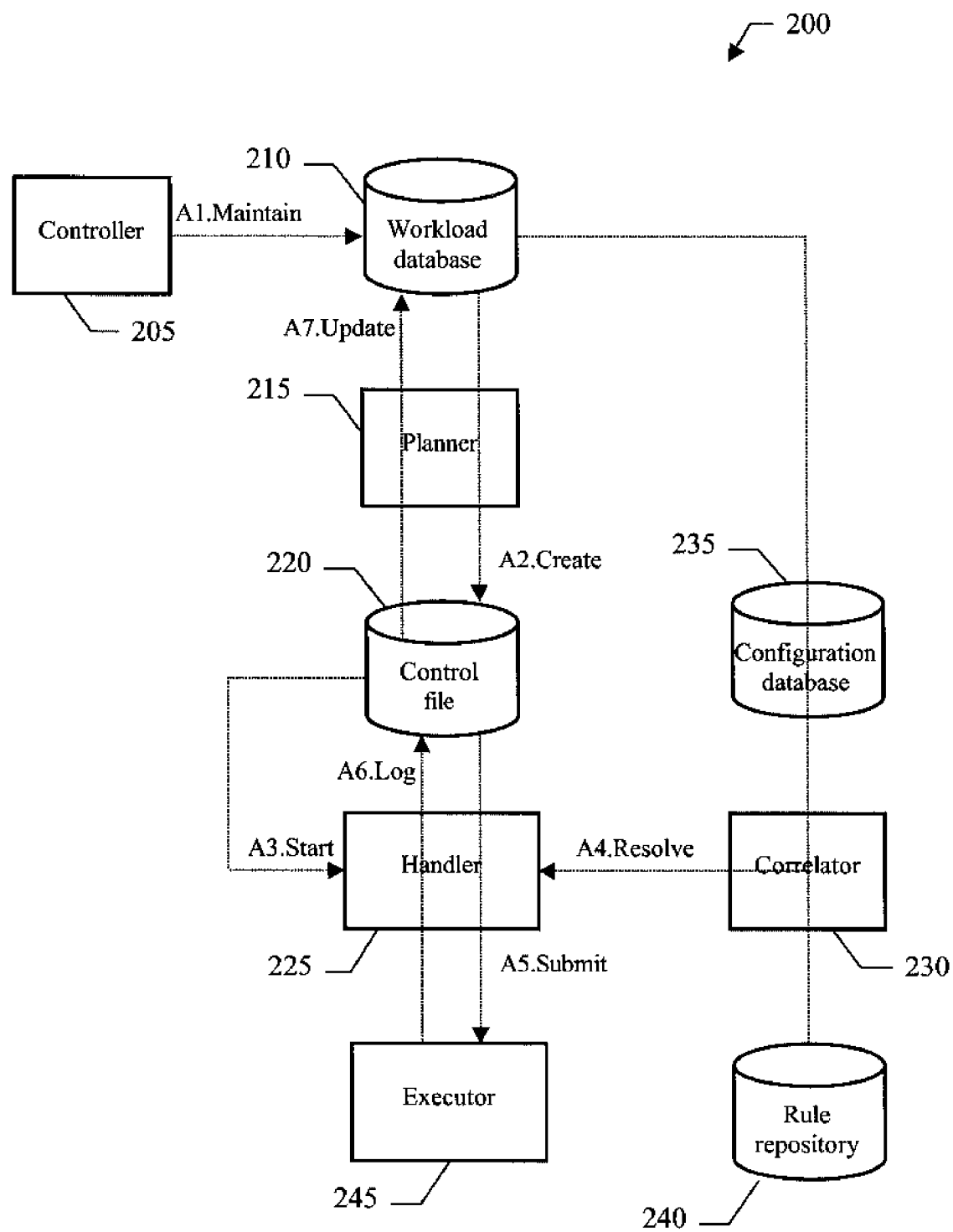
FIG. 2 is a collaboration diagram representing the roles of different software modules implementing the solution according to an embodiment of the invention.

Moving to FIG. 2, the main software modules that run on the scheduling server are illustrated. The information (programs and data) is typically stored on the hard-disk and loaded (at least partially) into the RAM of the scheduling server when the programs are running. The programs are initially installed onto the hard disk, for example, from CD-ROM. Particularly, the figure describes the static structure of the system (by means of the corresponding modules) and its dynamic behavior (by means of a series of exchanged messages, each one representing a corresponding action denoted with sequence numbers preceded by the symbol "A").

More in detail, the scheduling server runs a scheduler 200—for example, consisting of the above-mentioned "TWS". The scheduler 200 includes a controller 205 (such as the "Composer" program in the case of the "TWS"), which is used to maintain a workload database 210 (action "A1.Maintain").

The workload database 210 includes a descriptor of each job, which defines rules controlling its execution (written in a suitable control language, for example, XML-based). More specifically, the descriptor specifies the programs to be invoked, their arguments and environmental variables. The descriptor also includes statistics information relating to the job; for example, the statistics information provides a log of the actual duration of previous executions of the job, from which the estimated duration for its next executions may be inferred.

Moreover, the descriptor specifies dependencies that condition the execution of the job (since they must be satisfied before the job can be submitted); exemplary dependencies are time constraints (such as its run-cycle—like every day, week or month), sequence constraints (such as the successful completion of other jobs), or enabling constraints (such as the entering of a response to a prompt by an operator). The descriptor also indicates any (hardware and/or software) resources that are required by the job; those resources can be seen as further dependencies, which condition the execution of the job to their availability.

A particular type of required resources is the execution server where the job must be executed. Other types of required resources are auxiliary resources consisting of any physical or logical entities (for example, operating systems, database servers, and application servers) that must be used by the execution server. The required resources must have particular characteristics. More specifically, the characteristics of each required resource include required values of properties thereof (for example, the number of microprocessors and the size of the RAM of a generic server, the type and the size of the virtual memory of an operating system, the database controlled by a database server, and the software application run by an application server). The characteristics of the required resource can also include desired types of relationships to be satisfied with other required resources (for example, an execution server containing an operating system, and an execution server accessing a database server or an application server).

As it will be described in greater detail in the following, each required resource—including the required execution server—is specified in the descriptor by means of a formal definition based on its characteristics (hereinafter referred to as formal resource—and in particular formal execution server). More specifically, the formal resource includes the required values of specific properties. The formal resource can also include a formal definition of specific relationships (hereinafter referred to as formal relationships); typically, the formal relationship is between the resource at issue (source) and a single other resource (target), which in turn is specified by its formal definition. For example, it is possible to indicate that the job requires an execution server with a desired number of microprocessors; in addition, the same execution server must contain an operating system (of a desired type), and it must access a database server (controlling a desired database) and an application server (running a desired software application).

A planner 215 (such as the "Master Domain Manager" of the "TWS") creates a workload plan; the plan consists of a batch of jobs—together with their dependencies—scheduled for execution during a specific production period (typically, one day). A new plan is generally created automatically before every production period. For this purpose, the planner 215 processes the information available in the workload database 210 so as to select the jobs to be run and to arrange them in the desired sequence (according to their dependencies and expected duration).

The planner 215 creates the plan by adding the jobs to be executed (for the next production period) and by removing the preexisting jobs (of the previous production period) that have been completed; in addition, the jobs of the previous production period that did not complete successfully or that are still running or waiting to be run can be maintained in the plan (for their execution during the next production period). The plan so obtained is then stored into a corresponding control file 220—such as the "Symphony" of the "TWS" (action "A2.Create").

A handler 225 (such as the "Batchman" process of the "TWS") starts the plan at the beginning of every production period (action "A3.Start"). The handler 230 submits the jobs of the plan for execution as soon as possible—according to their dependencies. For this purpose, the handler 225 interfaces with a correlator 230, which accesses a configuration database 235 and a rule repository 240 (for example, maintained by a configurator—not shown in the figure).

The configuration database 235 stores information about the actual resources—including the execution servers—that are available in the system for executing the jobs (hereinafter referred to as concrete resources—and in particular concrete execution servers); more specifically, each concrete resource includes the values of its properties. For example, it is possible to specify that a concrete execution server has a specific number of microprocessors and a specific size of the RAM, that a concrete operating system is of a specific type and has a specific size of the virtual memory, that a concrete database server controls a specific database, or that a concrete application server runs a specific software application. The configuration database 235 also stores information about the actual relationships that are established among the concrete resources of the system (hereinafter referred to as concrete relationships). For example, it is possible to specify that a concrete execution server contains a specific concrete operating system, and that it accesses a specific concrete database server or a specific application server.

On the other hand, the rule repository 240 stores a set of expansion rules for shortcuts that may be used to define the formal relationships in the job descriptors. Particularly, each shortcut specifies the required values—for a formal resource—of specific properties that are associated with another type of resources. For example, it is possible to indicate that a formal execution server must have a desired size of the virtual memory, it must access a desired database, and it must run a desired software application. For each set of properties of a type of resources (that may be used in corresponding shortcuts), the rule repository 240 specifies a corresponding formal relationship with a formal resource of the same type. For example, it is possible to indicate that the property "virtual memory" is associated with the formal relationship "Contain" with a formal operating system, that the property "database" is associated with the formal relationship "Access" with a formal database server, and that the property "software application" is associated with the formal relationship "Access" with a formal application server (having the same properties).

For each job to be submitted, the correlator 230 at first expands the shortcuts (if any) into the corresponding complete definitions. For this purpose, each shortcut (indicating the required values of specific properties for another type of resources) is replaced with a formal relationship with a formal resource of this type having the required values of the same properties—as indicated in the rule repository 240. For example, a shortcut indicating that the formal execution server must have a desired virtual memory is replaced with a formal relationship between the formal execution server and a formal operating system having the same virtual memory; likewise, a shortcut indicating that the formal execution server must control a desired database and must run a desired software application is replaced with a formal relationship with a formal database server (controlling the same database) and with a formal relationship with a formal application server (running the same software application), respectively.

The correlator 230 then resolves the formal resources required by the job into the corresponding concrete resources. For this purpose, the correlator 230 determines the concrete resources that have the required values of the desired properties, and that satisfy the concrete relationships corresponding to the desired formal relationships (in turn resolved by determining the concrete resources corresponding to the involved formal resources). This operation then provides the concrete execution servers (corresponding to the formal execution server), which are eligible to execute the job—since they satisfy its resource dependencies (hereinafter referred to as eligible execution servers). The correlator 230 returns a list of the eligible execution servers to the handler 225 (action "A4.Resolve").

In the solution according to an embodiment of the present invention, as described in detail in the following, this result is achieved by translating the definition of the formal resources of the job into a single query; the query is then run on the configuration database 235 so as to obtain the desired list of eligible execution servers.

The proposed solution strongly facilitates the identification of the eligible execution servers (with respect to the iterative method known in the art for the same purpose).

Particularly, the operation of identifying the eligible execution servers is now very fast (despite their complex formal definition); this has a beneficial effect on the performance of the scheduler.

This allows the application of the solution based on the formal definition of the required resources in any environments (even with very strict time constraints).

Moreover, the query may be run as an atomic transaction on the configuration database 235. This ensures the consistency of the information that is used during the whole operation (since any update thereof is automatically prevented during the running of the query). Therefore, it is possible to guarantee the integrity of the results being obtained.

This avoids any errors in the execution of the jobs due to their submission on execution servers that do not have the required resources (thereby improving the execution flow of the whole plan).

All of the above fosters the widespread application of the solution based on the formal definition of the resources required by the jobs; this advantage is particular evident in specific environments (for example, in distributed systems—especially based on the Internet).

The handler 225 selects one of the eligible execution servers that are available for submitting the execution of the job (Action "A5.Submit"). For this purpose, the handler 225 generally interfaces with a workload manager (not shown in the Figure); in this way, the handler 225 can receive information about a current workload of each eligible execution server, so as to select the least busy one for executing the job.

The actual execution of the job is managed by a corresponding module 245 (such as the "Jobman" process of the "TWS"). The executor 245 directly launches and tracks the job, by interfacing with an agent (not shown in the Figure) running on the selected eligible execution server. The executor 245 returns feedback information about the execution of the job to the handler 225 (for example, whether the job has been completed successfully, its actual duration, and the like); the handler 225 logs this feedback information into the control file 220, so as to have a real-time picture of the current state of all the jobs of the plan (action "A6.Log").

At the end of the production period, the planner 215 extracts the feedback information of the completed jobs from the control file 220. The planner 215 updates the statistics information relating to the completed jobs accordingly, and saves it into the workload database 210 (action "A7.Update").

As shown in FIG. 3a, the configuration database includes a relational table for each type of concrete resources that is available in the system. Particularly, a table TB_ES stores information about the concrete execution servers. Additional tables are provided for the other types of (auxiliary) concrete resources; for example, a table TB_OS stores information about the concrete operating systems, a table TB_DS stores information about the concrete database servers, and a table TB_AS stores information about the concrete application servers.

For each concrete resource, the tables TB_ES, TB_OS, TB_DS and TB_AS include a record having a key data field uniquely identifying the concrete resource; the record further includes a data field for each property of the concrete resource (which data field stores the corresponding value). In the example at issue, each record of the table TB_ES—for the concrete execution servers—has the key data field (ES_ID) that includes an identifier of the concrete execution server; the record then has a data field (ES_NM) for the number of microprocessors, and a data field (ES_SZ) for the size of the RAM. Likewise, each record of the table TB_OS—for the concrete operating systems—has the key data field (OS_ID) that includes an identifier of the concrete operating system; the record then has a data field (OS_TY) for the operating system type, and a data field (OS_SZ) for the size of its virtual memory. Continuing to the table TB_DS —for the concrete database servers—each record has the key data field (DS_ID) that includes an identifier of the concrete database server, and another data field (DS_DB) for the controlled database. At the end, each record of the table TB_AS—for the concrete application servers—has the key data field (AS_ID) that includes an identifier of the concrete application server, and another data field (AS_SW) for the running software application.

The configuration database includes a further table TB_RL for the concrete relationships that are established among the concrete resources defined in the tables TB_ES, TB_OS, TB_DS and TB_AS. For each concrete relationship, the table TB_RL includes a record having a data field (RL_TY) for the type of the relationship; two other data fields are used for the source concrete resource (RL_SR) and for the target concrete resource (RL_TR) of the concrete relationship (which data fields store the identifiers of the corresponding concrete resources). For example, the category type may be "Contain"—for a generic concrete server (source) that contains a concrete operating system (target)—or it may be "Access"—for a concrete execution server (source) that accesses a concrete database server or a concrete application server (target).

An exemplary job to be executed on the system is defined by the following very simplified descriptor (wherein various details are omitted, in order not to obscure the description with unnecessary particulars):

```
<?xml "MyLanguage"?>
<jsdl:job "MyJob"/>
<jsdl:application "MyProgram"/>
<jsdl:resources>
    <jsdl:resource label="MyES" type="Execution server"/>
        <jsdl:requirement>
            <jsdl: AND>
            <jsdl:property label="ES_NM" value=">=2"/>
            <jsdl:property label="ES_SZ" value=">=10G"/>
            <jsdl:relationship type="Contain" target="MyOS"/>
            <jsdl:relationship type="Access" target="MyDS1"/>
            <jsdl:relationship type="Access" target="MyDS2"/>
                </jsdl: AND>
                <jsdl: OR>
            <jsdl:relationship type="Access"
            target="MyAS1"/>
            <jsdl:relationship type="Access"
            target="MyAS2"/>
                </jsdl: OR>
        </jsdl:requirement>
    </jsdl:resource>
    <jsdl:resource label="MyOS" type="Operating system">
        <jsdl:requirement>
            <jsdl: AND>
            <jsdl:property label="OS_TY" value="OS_TY1"/>
            <jsdl:property label="OS_SZ" value=">=256M"/>
                </jsdl: AND>
        </jsdl:requirement>
    </jsdl:resource>
    <jsdl:resource label="MyDS1" type="Database server">
        <jsdl:requirement>
            <jsdl:property label="DS_DB"
            value="DS_DB1"/>
        </jsdl:requirement>
    </jsdl:resource>
    <jsdl:resource label="MyDS2" type="Database server">
        <jsdl:requirement>
            <jsdl:property label="DS_DB"
            value="DS_DB2"/>
        </jsdl:requirement>
    </jsdl:resource>
    <jsdl:resource label="MyAS1" type="Application server">
        <jsdl:requirement>
            <jsdl:property label="AS_SW"
            value="AS_SW1"/>
        </jsdl:requirement>
    </jsdl:resource>
    <jsdl:resource label="MyAS2" type="Application server">
        <jsdl:requirement>
            <jsdl:property label="AS_SW"
            value="AS_SW2"/>
        </jsdl:requirement>
    </jsdl:resource>
</jsdl:resources>
```

The descriptor starts with a header that identifies the control language (i.e., "MyLanguage"—including its version and encoding style) and the job (i.e., "MyJob"—including its name and type). The descriptor continues with the specification of the program to be invoked (i.e., "MyProgram"—including its name, arguments and environmental variables). The descriptor then defines the formal resources required by the job. Particularly, the job "MyJob" requires a formal execution server "MyES". The formal execution server "MyES" must have at least 2 microprocessors (property ES_NM) and at least 10 G of RAM (property ES_SZ). Moreover, the formal execution server "MyES" must contain a formal operating system "MyOS"; at the same time, the formal execution server "MyES" must access a formal database server "MyDS1" and a formal database server "MyDS2". In addition, the formal execution server "MyES" must access a formal application server "MyAS1" or a formal application server "MyAS2". The formal operating system "MyOS" must be of the type "OS_TY1" (property OS_TY) and it must have at least 256 M of virtual memory (property OS_SZ). The formal database server "MyDS1" must control a database "DS_DB1" (property DS_DB); likewise, the formal database server "MyDS2" must control a database "DS_DB2". At the end, the formal application server "MyAS1" must run a software application "AS_SW1" (property AS_SW); likewise, the formal application server "MyAS2" must run a software application "AS_SW2".

The same job may also be described with this equivalent (compacted) descriptor:

```
<?xml "MyLanguage"?>
<jsdl:job "MyJob"/>
<jsdl:application "MyProgram"/>
<jsdl:resources>
    <jsdl:resource label="MyES" type="Execution server"/>
        <jsdl:requirement>
            <jsdl: AND>
                <jsdl:property label="ES_NM" value=">=2"/>
                <jsdl:property label="ES_SZ" value=">=10G"/>
                <jsdl:property label="OS_TY" value="OS_TY1"/>
                <jsdl:property label="OS_SZ" value=">=256M"/>
                <jsdl:relationship type="Access" target="MyDS1"/>
                <jsdl:relationship type="Access" target="MyDS2"/>
                </jsdl: AND>
                <jsdl: OR>
                <jsdl:relationship type="Access" target="MyAS1"/>
                <jsdl:relationship type="Access" target="MyAS2"/>
                </jsdl: OR>
        </jsdl:requirement>
    </jsdl:resource>
    <jsdl:resource label="MyDS1" type="Database server">
        <jsdl:requirement>
            <jsdl:property label="DS_DB" value="DS_DB1"/>
        </jsdl:requirement>
    </jsdl:resource>
    <jsdl:resource label="MyDS2" type="Database server">
        <jsdl:requirement>
            <jsdl:property label="DS_DB" value="DS_DB2"/>
        </jsdl:requirement>
    </jsdl:resource>
    <jsdl:resource label="MyAS1" type="Application server">
        <jsdl:requirement>
            <jsdl:property label="AS_SW" value="AS_SW1"/>
        </jsdl:requirement>
    </jsdl:resource>
    <jsdl:resource label="MyAS2" type="Application server">
        <jsdl:requirement>
            <jsdl:property label="AS_SW" value="AS_SW2"/>
        </jsdl:requirement>
    </jsdl:resource>
</jsdl:resources>
```

In this case, the formal relationship specifying that the formal execution server "MyES" must contain a formal operating system "MyOS" of the type "OS_TY1" and with at least 256 M of virtual memory has been replaced with two corresponding shortcuts—directly indicating that the formal execution server "MyES" must have the operating system type "OS_TY1" and at least 256 M of virtual memory.

The query (for identifying the corresponding concrete execution servers) will include a set of selection fields for the formal execution server. The selection fields correspond to the data fields of the table (in the configuration database) for the concrete execution servers. For each formal relationship, the query further includes a set of selection fields corresponding to the data fields of the corresponding table; another set of selection fields is added for the data fields of the table for the concrete resources of the same type as the target formal resource. Each set of selection fields may correspond to all the fields of the respective table, or at least to the key data field thereof and the other data fields required in the definition of the query.

When the descriptor includes two or more formal relationships for target formal resources of the same type in logical AND conjunction, corresponding sets of selection fields are required (for each formal relationship and its target formal resource). In this way, it is possible to retrieve all the concrete resources that satisfy the formal relationships.

Conversely, when the descriptor includes two or more formal relationships for target formal resources of the same type in logical OR conjunction, a single set of the selection fields is provided (for all the formal relationships and their target formal resources). In this way, the query is as compact as possible.

In any case, the different sets of selection fields for the same table are discriminated by means of corresponding alias; particularly—for each one of the relationships in logical AND conjunction or for all the relationships in logical OR conjunction—a new alias is defined for the relationship table and a new alias is defined for the corresponding resource table.

The query then includes a selection condition. The selection condition sets the selection fields of each property to the corresponding required values. For each formal relationship the selection condition sets the selection field for the type of the relationship to a corresponding identifier; the selection fields for the source formal resource and for the target formal resource are then set to the selection fields of the corresponding key data fields.

For example, the above-mentioned descriptor (in either its extended or compacted form) will generate the following query:

```
Select
    ES0.ES_ID as C01,
    ES0.ES_NM as C02,
    ES0.ES_SZ as C03,
    RL0.RL_TY as C04,
    RL0.RL_SR as C05,
    RL0.RL_TR as C06,
    OS0.OS_ID as C07,
    OS0.OS_TY as C08,
    OS0.OS_SZ as C09,
    RL1.RL_TY as C10,
    RL1.RL_SR as C11,
    RL1.RL_TR as C12,
    DS0.DS_ID as C13,
    DS0.DS_DB as C14,
    RL2.RL_TY as C15,
    RL2.RL_SR as C16,
    RL2.RL_TR as C17,
    DS1.DS_ID as C18,
    DS1.DS_DB as C19,
    RL3.RL_TY as C20,
    RL3.RL_SR as C21,
    RL3.RL_TR as C22,
    AS0.AS_ID as C23,
    AS0.AS_SW as C24,
```

-continued

```
FROM
    ES0 TB_ES,
    RL0 TB_RL,
    RL1 TB_RL,
    RL2 TB_RL,
    RL3 TB_RL,
    OS0 TB_OS,
    DS0 TB_DS,
    DS1 TB_DS,
    AS0 TB_AS,
WHERE
    ES0.ES_NM=">=2"
        AND
    ES0.ES_SZ>="10G"
        AND
    (RL0.RL_TY="Contain" AND RL0.RL_SR=ES0.ES_ID AND
RL0.RL_TR=OS0.OS_ID) AND (OS0.OS_TY="OS_ID1" AND
OS0.OS_SZ=">=256M")
        AND
    (RL1.RL_TY="Access" AND RL1.RL_SR=ES0.ES_ID AND
RL1.RL_TR=DS0.DS_ID) AND (DS0.DS_DB="DS_DB1")
        AND
    (RL2.RL_TY="Access" AND RL2.RL_SR=ES0.ES_ID AND
RL2.RL_TR=DS1.DS_ID) AND (DS1.DS_DB="DS_DB2")
        AND
    (RL3.RL_TY="Access" AND RL3.RL_SR=ES0.ES_ID AND
RL3.RL_TR=AS0.AS_ID) AND (AS0.AS_SW="AS_SW1"
OR AS0.AS_SW="AS_SW2")
```

The result of this query on the above-described configuration database is shown in FIG. 3b—by means of a corresponding table TB_RS. The table TB_RS must include at least the key fields of the alias of the execution server table; preferably (as in the example shown in the figure) the table TB_RS also includes the other data fields of the alias of the execution server table, and all the data fields of each alias of the involved resource tables. As can be seen, the table TB_RS includes a record for the eligible execution server ES_ID1—which has 2 microprocessors and 15 G of RAM, which contains the concrete operating system "OS_ID1" (of the type "OS_TY1" and with 256 M of virtual memory), which accesses the concrete database server "DS_ID1" (controlling the database "DS_DB1") and the concrete database server "DS_ID2" (controlling the database "DS_DB2"), and which accesses the concrete application server "AS_ID1" (running the software application "AS_SW1"); the table TB_RS includes a further record for the eligible execution server ES_ID6—which has 4 microprocessors and 10 G of RAM, which contains the concrete operating system "OS_ID6" system (of the type "OS_TY1" and with 512M of virtual memory), which accesses the concrete database server "DS_ID1" (controlling the database "DS_DB1") and the concrete database server "DS_ID3" (controlling the database "DS_DB2"), and which accesses the concrete application server "AS_ID3" (running the software application "AS_SW2").

Figure 4:
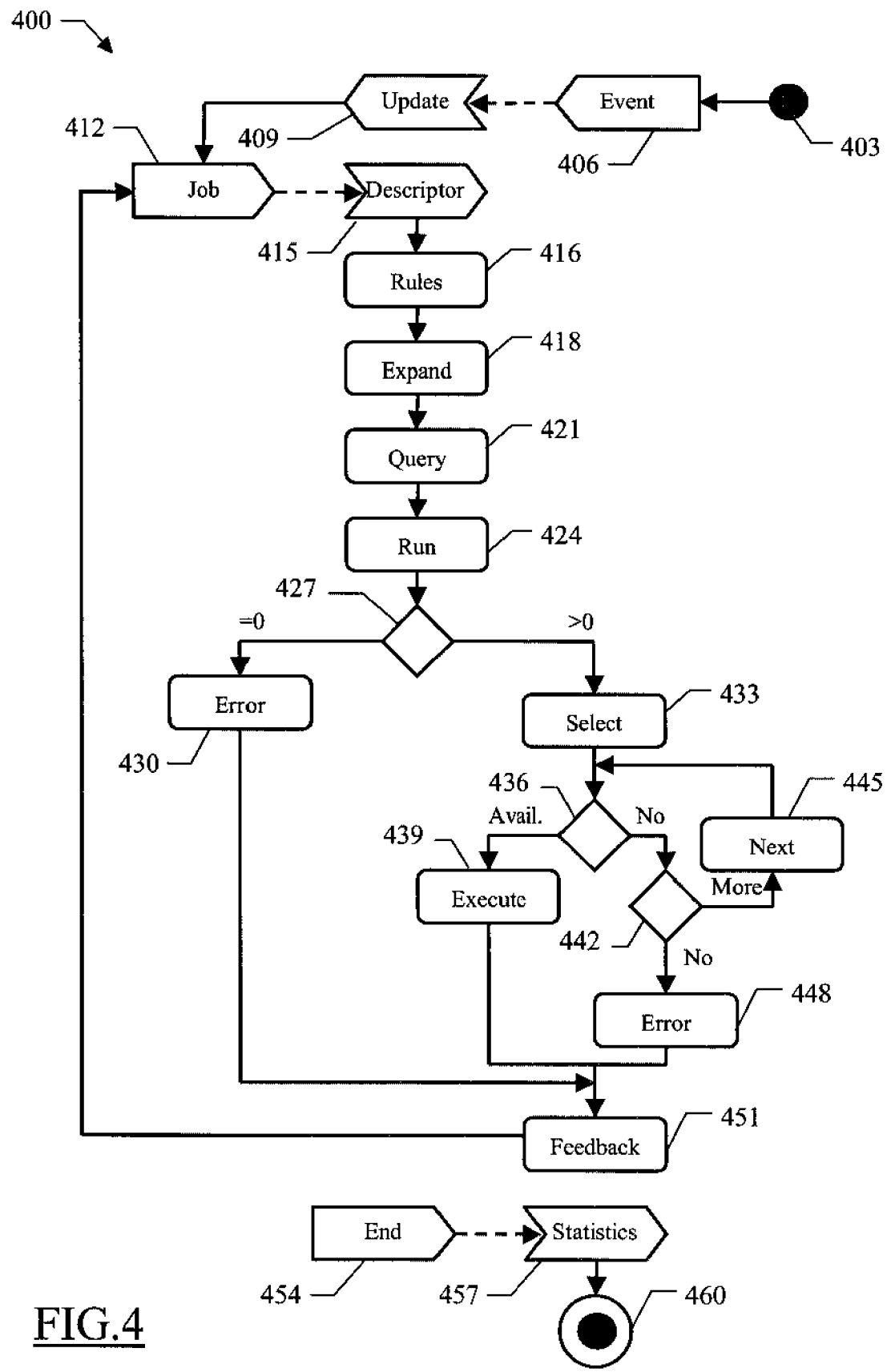
FIG. 4 is a diagram describing the flow of activities relating to an implementation of the solution according to an embodiment of the invention.

Considering now FIG. 4, the logic flow of a scheduling process according to an embodiment of the invention implements a method 400.

The method begins at the black start circle 403, and then passes to block 406 in response to a triggering event (for example, every day or whenever the configuration of the system changes). The configuration database is then updated accordingly at block 409.

The desired plan is started at the beginning of every production period; every job of the plan is submitted for execution at block 412 as soon as possible (according to its dependencies).

The method passes to block 415, wherein the descriptor of the job is passed to the correlator. In response thereto, the correlator at block 416 parses the descriptor; for each shortcut encountered, the correlator retrieves the corresponding definition from the rule repository. Each shortcut is then resolved at block 418 into the corresponding formal relationship and formal resource (as indicated in the corresponding expansion rule). Continuing to block 421, the correlator creates the query corresponding to the descriptor so obtained. The query is then run at block 424 on the configuration database, so as to obtain the list of the eligible execution servers for the job.

The flow of activity branches at decision block 427 according to the result of the query. If no eligible execution server has been found, an error condition is entered at block 430; the method then descends into block 451 (described in the following). On the contrary, a first one of the eligible execution servers is selected at block 433 (for example, according to a load-balancing algorithm). A test is made at block 436 to verify whether the (selected) eligible execution server is available for executing the job. If so, the job is launched on this eligible execution server at block 439; the flow of activity then passes to block 451 as well. Conversely, the method verifies at block 442 whether further eligible execution servers have been returned by the query. In the affirmative case, a further eligible execution server is likewise selected at block 445. The method then returns to block 436 to reiterate the same operations. Conversely, when the job cannot be executed on any one of the eligible execution servers, an error condition is entered at block 448, and the method then descends into block 451. In any case, the feedback information about the execution of the job is saved at block 451 into the control file. The flow of activity then returns to block 412 to process a next job to be submitted for execution.

At the end of the production period (block 454), the statistics information relating to the completed jobs is updated in the workload database at block 457 according to the corresponding feedback information. The method then ends at concentric white/black stop circles 460.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the system has a different architecture or includes equivalent units. Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like).

The proposed technique has equal applicability to equivalent schedulers. Moreover, even though in the preceding description reference has been made to non-interactive jobs, this is not to be intended as a limitation; indeed, the same solution may be used to schedule the execution of any kind of work units (for example, interactive tasks).

Of course, the above-described resources, properties and relationships are merely illustrative. Moreover, the proposed method applies to every job or to selected ones only, and to every execution server or to some of them only. Alternatively, the concrete resources of the system (including its concrete execution servers) may be defined in any other way; likewise, the jobs, the formal resources and/or the formal relationships may be defined with equivalent formalisms. In addition, it is possible to build the query in a similar manner (for example, with joints among the selection fields), or it is possible to express it in whatever other language.

The proposed solution lends itself to be applied even to relationships among the auxiliary resources; for example, it is possible to have a database server accessing an application server, which in turn accesses a database server, and so on.

Even though in the preceding description reference has been made to relationships combined in logical OR conjunctions and in logical AND conjunctions, this is not limitative. For example, the descriptor may support other logical operators (such as NAND, NOR, NOT and the like), or even more complex conditions. In any case, a very simple implementation based on single relationships is within the scope of the invention.

Similar considerations apply if the configuration database has a different structure. For example, it is possible to have a single table for all the concrete resources.

Vice versa, nothing prevents defining a dedicated table for every type of relationships.

In any case, simplified implementations without the definition of the types of the resources or that support a single type of relationships are within the scope of the invention; alternatively, it is possible to define more complex relationships (for example, with multiple source and/or target resources).

In a different embodiment of the invention, the shortcuts are defined and/or resolved in a different way. In any case, this feature is not strictly necessary, and it may be omitted in some implementations.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (by using similar steps, removing some steps being not essential, or adding further optional steps—even in a different order). In any case, the program may take any form suitable to be used by or in connection with any data processing system, such as external or resident software, firmware, or microcode (either in object code or in source code). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like.

In any case, the solution according to the present invention lends itself to be implemented with a hardware structure (for example, integrated in a chip of semiconductor material), or with a combination of software and hardware.

The invention claimed is:

1. A method for scheduling execution of work units in a data processing system, wherein the method comprises:
    providing a configuration database including an indication of concrete resources available in the system for executing the work units and an indication of concrete relationships established in the system among the concrete resources, each concrete resource having a set of corresponding properties,
    providing a descriptor of at least one work unit to be executed, the descriptor including a definition of a set of formal resources required by the work unit and an indication of a set of formal relationships to be satisfied by the formal resources, the definition of each formal resource including an indication of a set of required values of corresponding properties,
    creating a query for each work unit, the query including a set of selection fields for each formal resource and a selection condition based on the required values of the formal resources and on the formal relationships,
    running the query for each work unit on the configuration database, the query returning an indication of concrete resources corresponding to the formal resources, and
    submitting each work unit for execution on a selected one of the returned concrete resources corresponding to each formal resource;
    wherein each resource is of one of a predefined set of types, for at least one work unit the formal relationships including a plurality of formal relationships to be satisfied in logical AND with a plurality of formal resources of a single type, the query including a different set of alias selection fields for each formal resource of the single type.

2. The method according to claim 1, wherein the resources include execution entities for executing the work units and auxiliary resources to be used by the execution entities, wherein for each job the formal resources include a formal execution server and formal auxiliary resources, and the formal relationships includes formal relationships among the formal execution server and the formal auxiliary resources, and wherein the returned concrete resources consist of concrete execution servers corresponding to the formal execution server.

3. The method according to claim 1, wherein for at least one work unit the formal relationships include a plurality of formal relationships to be satisfied in logical OR conjunction with a plurality of formal resources of a further single type, the query including one set of alias selection fields for the formal resources of the further single type.

4. The method according to claim 1, wherein the configuration database includes a resource table for each type of concrete resources, each set of alias selection fields including a resource alias for each corresponding resource table.

5. The method according to claim 1, wherein each relationship is of one of a predefined set of further types, and wherein the configuration database includes a relationship table for all the concrete relationships, the relationship table having a data field for the further type of each concrete relationship, each set of alias selection fields including a relationship alias for each corresponding relationship table.

6. The method according to claim 5, wherein each concrete relationship is established between a source concrete resource consisting of a concrete execution entity and a target concrete resource, and wherein the relationship table further includes a further data field for the source concrete resource and a still further data field for the target concrete resource of each concrete relationship, each set of alias selection fields including a single resource alias for the resource table of the corresponding target concrete resource.

7. The method according to claim 1, wherein for at least one of the work units the descriptor includes at least one shortcut defining a formal resource of a first type with an indication of a set of required values of properties associated with a second type of resources different from the first type, the method further including the steps of:

providing a set of expansion rules associating the properties of at least one type of resources with a formal relationship with a formal resource of said type, and expanding each shortcut according to the expansion rules by replacing the required values of the formal resource of the first type with the corresponding formal relationship with the formal resource of the second type having the required values of the formal resource of the first type.

8. A computer program product stored on a non-transitory storage medium for performing a method for scheduling execution of work units in a data processing system, when the computer program is executed on a data processing system for performing the method which comprises:

providing a configuration database including an indication of concrete resources available in the system for executing the work units and an indication of concrete relationships established in the system among the concrete resources, each concrete resource having a set of corresponding properties, providing a descriptor of at least one work unit to be executed, the descriptor including a definition of a set of formal resources required by the work unit and an indication of a set of formal relationships to be satisfied by the formal resources, the definition of each formal resource including an indication of a set of required values of corresponding properties, creating a query for each work unit, the query including a set of selection fields for each formal resource and a selection condition based on the required values of the formal resources and on the formal relationships, running the query for each work unit on the configuration database, the query returning an indication of concrete resources corresponding to the formal resources, and submitting each work unit for execution on a selected one of the returned concrete resources corresponding to each formal resource;

wherein each resource is of one of a predefined set of types, for at least one work unit the formal relationships including a plurality of formal relationships to be satisfied in logical AND with a plurality of formal resources of a single type, the query including a different set of alias selection fields for each formal resource of the single type.

9. The product according to claim 8, wherein the resources include execution entities for executing the work units and auxiliary resources to be used by the execution entities, wherein for each job the formal resources include a formal execution server and formal auxiliary resources, and the formal relationships includes formal relationships among the formal execution server and the formal auxiliary resources, and wherein the returned concrete resources consist of concrete execution servers corresponding to the formal execution server.

10. The product according to claim 8, wherein for at least one work unit the formal relationships include a plurality of formal relationships to be satisfied in logical OR conjunction with a plurality of formal resources of a further single type, the query including one set of alias selection fields for the formal resources of the further single type.

11. The product according to claim 8, wherein the configuration database includes a resource table for each type of concrete resources, each set of alias selection fields including a resource alias for each corresponding resource table.

12. The product according to claim 8, wherein each relationship is of one of a predefined set of further types, and wherein the configuration database includes a relationship table for all the concrete relationships, the relationship table having a data field for the further type of each concrete relationship, each set of alias selection fields including a relationship alias for each corresponding relationship table.

13. The product according to claim 12, wherein each concrete relationship is established between a source concrete resource consisting of a concrete execution entity and a target concrete resource, and wherein the relationship table further includes a further data field for the source concrete resource and a still further data field for the target concrete resource of each concrete relationship, each set of alias selection fields including a single resource alias for the resource table of the corresponding target concrete resource.

14. The product according to claim 8, wherein for at least one of the work units the descriptor includes at least one shortcut defining a formal resource of a first type with an indication of a set of required values of properties associated with a second type of resources different from the first type, the method further including the steps of:

providing a set of expansion rules associating the properties of at least one type of resources with a formal relationship with a formal resource of said type, and expanding each shortcut according to the expansion rules by replacing the required values of the formal resource of the first type with the corresponding formal relationship with the formal resource of the second type having the required values of the formal resource of the first type.

15. A system for scheduling execution of work units in a data processing system, comprising:

a memory for storing computer program instructions;

a processor for executing the instructions in the memory;

a configuration database including an indication of concrete resources available in the system for executing the work units and an indication of concrete relationships established in the system among the concrete resources, each concrete resource having a set of corresponding properties, a controller for providing a descriptor of at least one work unit to be executed, the descriptor including a definition of a set of formal resources required by the work unit and an indication of a set of formal relationships to be satisfied by the formal resources, the definition of each formal resource including an indication of a set of required values of corresponding properties, a correlator for creating a query for each work unit, the query including a set of selection fields for each formal resource and a selection condition based on the required values of the formal resources and on the formal relationships, and for running the query for each work unit on the configuration database, the query returning an indication of concrete resources corresponding to the formal resources, and a handler for submitting each work unit for execution on a selected one of the returned concrete resources corresponding to each formal resource;

wherein each resource is of one of a predefined set of types, for at least one work unit the formal relationships including a plurality of formal relationships to be satisfied in logical AND with a plurality of formal resources of a single type, the query including a different set of alias selection fields for each formal resource of the single type.

16. The system according to claim 15, wherein the resources include execution entities for executing the work units and auxiliary resources to be used by the execution entities, wherein for each job the formal resources include a formal execution server and formal auxiliary resources, and the formal relationships includes formal relationships among the formal execution server and the formal auxiliary resources, and wherein the returned concrete resources consist of concrete execution servers corresponding to the formal execution server.

17. The system according to claim 15, wherein for at least one work unit the formal relationships include a plurality of formal relationships to be satisfied in logical OR conjunction with a plurality of formal resources of a further single type, the query including one set of alias selection fields for the formal resources of the further single type.

18. The system according to claim 15, wherein the configuration database includes a resource table for each type of concrete resources, each set of alias selection fields including a resource alias for each corresponding resource table.

19. The system according to claim 15, wherein each relationship is of one of a predefined set of further types, and wherein the configuration database includes a relationship table for all the concrete relationships, the relationship table having a data field for the further type of each concrete relationship, each set of alias selection fields including a relationship alias for each corresponding relationship table.

* * * * *